United States Patent [19]

Kukuljan

[11] Patent Number: 5,525,777
[45] Date of Patent: Jun. 11, 1996

[54] APPARATUS AND METHOD FOR FLEXIBLE POINT-TO-POINT SOLDERING

[75] Inventor: Z. Val Kukuljan, Whitefish Bay, Wis.

[73] Assignee: Allen-Bradley Company, Inc., Milwaukee, Wis.

[21] Appl. No.: 292,840

[22] Filed: Aug. 19, 1994

[51] Int. Cl.[6] .................................................. B23K 26/02
[52] U.S. Cl. ............................. 219/121.83; 219/121.65; 219/121.78; 228/45
[58] Field of Search ....................... 219/121.63, 121.64, 219/121.85, 56, 56.1, 56.22, 121.74, 121.78, 121.82, 121.83; 228/41, 45, 51, 52, 53; 901/41, 42

[56] References Cited

U.S. PATENT DOCUMENTS

| | | | |
|---|---|---|---|
| 4,832,246 | 5/1989 | Ono et al. | 228/1.1 |
| 4,899,924 | 2/1990 | Kawaguchi | 228/242 |
| 4,926,345 | 5/1990 | Novak et al. | 364/513 |
| 5,052,338 | 10/1991 | Maiorca et al. | 118/668 |
| 5,122,635 | 6/1992 | Knodler et al. | 219/121.63 |
| 5,261,590 | 11/1993 | Tsai | 228/41 |

FOREIGN PATENT DOCUMENTS

| | | |
|---|---|---|
| 2-295200 | 12/1990 | Japan . |
| 4-4979 | 1/1992 | Japan . |
| 5-200556 | 8/1993 | Japan . |
| 5-235535 | 9/1993 | Japan . |

*Primary Examiner*—Teresa J. Walberg
*Assistant Examiner*—J. Pelham
*Attorney, Agent, or Firm*—Patrick S. Yoder; John M. Miller; John J. Horn

[57] ABSTRACT

A point-to-point soldering apparatus applies solder to predetermined points on a workpiece in response to control signals from a control circuit. The apparatus includes a heat source moveable to first locations adjacent to the solder points in response to control signals from the control circuit and a solder material source moveable to second locations adjacent to the solder points independently of the heat source in response to control signals from the control circuit. The heat source is mounted on a first robotic positioner and the material source is mounted on a second robotic positioner for independent movement and positioning. A user-programmable controller executes preset soldering routines in which the heat source and material source are positioned adjacent to solder points and commanded to apply heat and solder in accordance with the soldering routines. A code reader may be provided for detecting a code representing the configuration of workpieces to be soldered and the soldering routine to be executed by the controller. A tool wear monitor may be provided for determining the degree of tool wear, whereby the soldering tool is automatically changed when an unacceptable degree of wear is detected. A method for applying solder to points on a workpiece is also presented.

20 Claims, 6 Drawing Sheets

APPARATUS AND METHOD FOR FLEXIBLE POINT-TO-POINT SOLDERING

BACKGROUND OF THE INVENTION

The present invention relates generally to a point-to-point soldering apparatus and method. More particularly, the invention relates to an automated point-to-point soldering apparatus and method wherein a heat source, or soldering tool, and a solder material source are moveable and positionable independently with respect to one another.

A great number of electronic manufacturing and packaging applications require precise soldering at particular locations on a workpiece, such as for mounting and connecting component leads on a printed circuit board. While many soldering operations may be made at once in devices such as wave soldering machines, other applications require soldering of components on the "top side" of a workpiece, effectively precluding wave soldering. A technique that has been developed for such applications is point-to-point soldering, in which a heat source, such as a hot iron soldering tool, melts solder wire at the solder point to cause the desired quantity of material to flow around the solder point.

Known point-to-point soldering devices are automated to increase production rate and accuracy, often incorporating a programmable controller for storing and executing a preset routine for a particular workpiece configuration. These conventional point-to-point soldering devices include a robot on which a soldering tool and a solder material feed tip are mounted. The robot moves the soldering tool and feed tip into position at or near the solder points, where the controller causes the tool and feed tip to deposit a predetermined quantity of solder material. Moreover, because the soldering tool and feed tip are mounted in a single robot positioner in these soldering devices, the trajectories of the tool and feed tip between solder points are not independent of one another, and thus may not be independently optimized. Furthermore, during soldering operations at each solder point, the orientation of the soldering tool with respect to the feed tip is generally fixed. As a result, such devices cannot effectively reach solder points deep between surface mounted components, limiting the level of integration of circuits and requiring expensive and time-consuming hand soldering of such difficult to reach points.

A further drawback of known point-to-point soldering devices is the lack of mobility of the soldering tool and solder material feed tip during a soldering operation at a particular solder point. In many soldering operations, particularly on larger terminal attachments, less than optimal flow of solder material can result in so-called cold soldering effects, that is, inferior solder joints due to crystallization of solder material during flow at the solder point. While such effects can be avoided by displacing the material feed tip or the soldering tool, or both, during the soldering operation, conventional point-to-point soldering apparatus are generally incapable of such movement because the material feed tip is mounted on the same positioner as the soldering tool.

In addition, while known point-to-point soldering devices are automated and programmable, they are generally programmed to execute a preset routine on a single workpiece configuration. Thus, if workpieces of different configurations are to be soldered, the program must be changed or a different program must be selected from among various preset routines by operator intervention. Such intervention is both time consuming and seriously limits the flexibility of the device in processing small quantities of different workpieces.

Finally, where hot metal soldering tools are used as a heat source, as in many industrial applications, tool tip wear occurs due to heating, contact with solder points and repeated cleaning of the tool. When tools become excessively worn, the quality of contact with solder points is reduced, resulting in less than optimal soldering. In known point-to-point soldering devices, such tool wear is generally either estimated and tools changed on a periodic basis, or measured by operator intervention. In the former case tools may not be used to their full potential, while in this latter case soldering must be halted for the time required for operator intervention, resulting in expensive down-time.

The present invention advantageously provides an apparatus and method for point-to-point soldering that permit independent positioning of a heat source and a solder material source so their angular orientation with respect to one another may be independently controlled to successfully solder difficult to reach solder points.

The present invention also provides an apparatus and method for point-to-point soldering permitting independent optimization of the trajectories of a heat source and a solder material source between solder points.

Moreover, the present invention provides an apparatus and method for point-to-point soldering wherein independent displacement of a soldering tool and a solder material feed device is possible during a soldering operation to avoid cold soldering effects.

The present invention further provides an apparatus and method for programmable point-to-point soldering capable of executing a variety of preset soldering routines on workpieces of different configuration without the need for operator intervention.

The present invention also advantageously provides an automated point-to-point soldering apparatus capable of detecting soldering tool wear and replacing worn tools automatically.

SUMMARY OF THE INVENTION

In accordance with one aspect of the invention, a point-to-point soldering apparatus comprises a heat source and a solder material source and applies solder to predetermined points on a workpiece. The apparatus is coupled to a control circuit and is responsive to control signals from it. The heat source is moveable between first locations adjacent to the predetermined points in response to control signals from the control circuit. The solder material source is moveable between second locations adjacent to the predetermined points independently of the heat source in response to control signals from the control circuit.

In accordance with another aspect of the invention, a soldering apparatus comprises a pair of robotic positioners. A heat source is coupled to the first robotic positioner and moveable to first locations adjacent to the predetermined points, while a solder material source is coupled to the second robotic positioner and moveable to second locations adjacent to the predetermined points. A control circuit is coupled to the robotic positioners and configured to generate control signals and to apply these signals to the positioners to move the heat source and the solder material source to the first and second locations.

In accordance with yet another aspect of the invention, a soldering apparatus further includes a workpiece recognition device for detecting one or more characteristics of a workpiece indicative of its configuration. The device generates an identification signal representative of the selected characteristic. The control circuit is coupled to the workpiece recognition device and configured to receive the identification signals. The control circuit generates control signals based upon the workpiece configuration and applies the control signals to robotic positioners to move the heat source and the solder material source to the first and second locations.

In accordance with another aspect of the invention, a method is provided for applying solder to a solder point on a workpiece. The method includes the steps of moving a heat source coupled to a first robotic positioner to a location adjacent to the solder point, moving a solder material feed source coupled to a second robotic positioner to a second location adjacent to the solder point, applying heat from the heat source at the solder point, and feeding solder material from the solder material feed source, whereby solder material is made to flow at the solder point.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
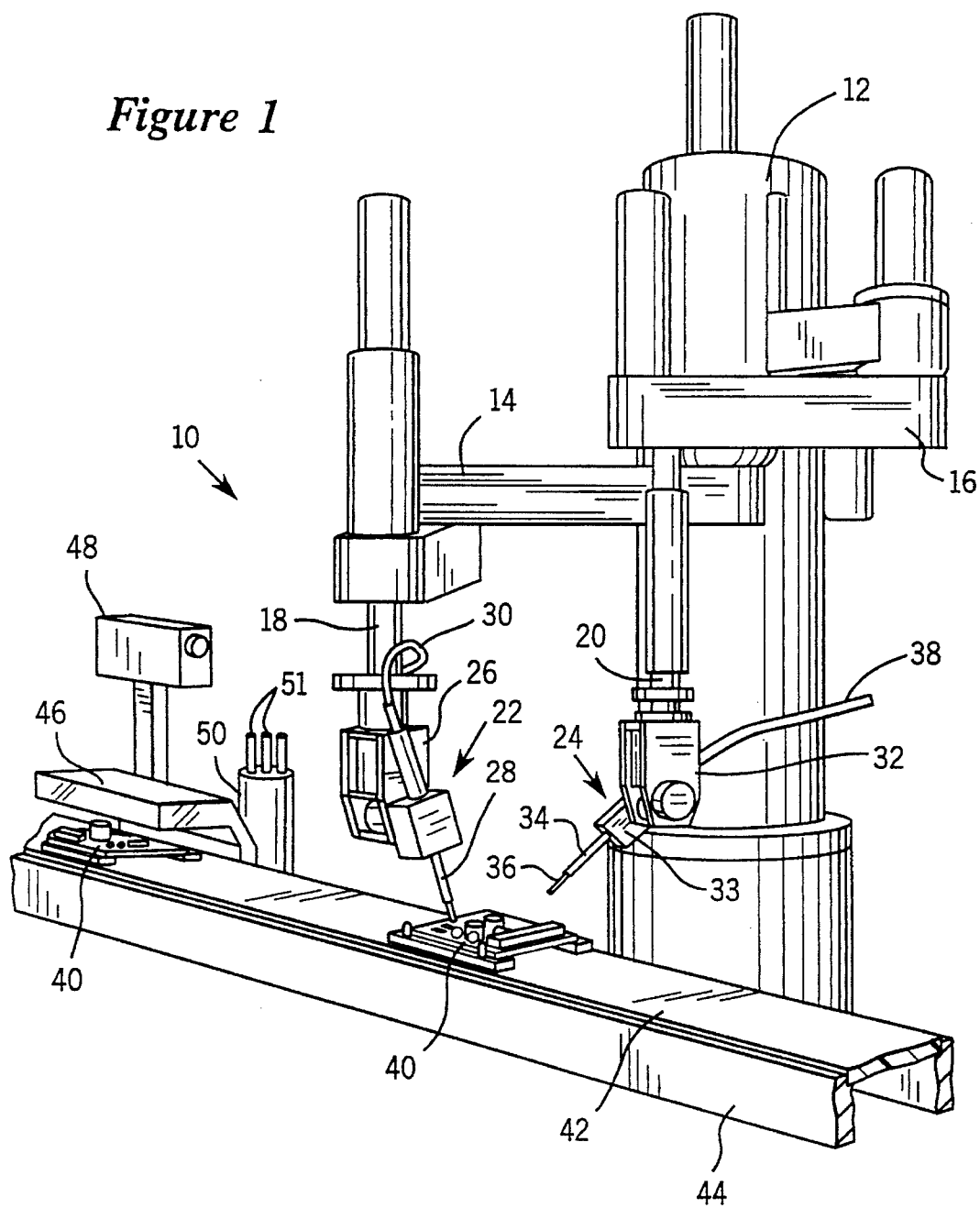
FIG. 1 is perspective view of a point-to-point soldering apparatus in accordance with the present invention.

Turning now to the drawings and referring to FIG. 1, a point-to-point soldering apparatus 10 is shown as including a robot 12 supporting two robot arm positioners 14 and 16. As illustrated in the FIGURES, robot 12 is a double-arm SCARA-type assembly robot, with each positioner 14, 16 having three vertical rotational axes. Alternatively, positioners 14 and 16 each could be part of separate SCARA robots, or included in cartesian or other complex motion type robots. Positioners 14 and 16 support vertical shafts 18 and 20, respectively, that are capable of both rotational and vertical linear movement. As shown in the FIGURES, a heat source 22 is fitted to the lower end of shaft 18, while a solder material source 24 is fitted to the lower end of shaft 20, such that the heat source 22 and solder material source 24 are independently positionable with respect to one another as will be described in greater detail below.

Heat source 22 includes a soldering tool carrier 26 adapted to hold and maneuver a soldering tool 28. Soldering tool 28 is designed to concentrate sufficient heat energy at the solder point to raise the temperature for effective liquidation and flow of the solder material. Preferably, soldering tool 28 is a hot-metal type tool coupled to a source of electrical current and to a control circuit 100 (FIG. 6) by conductors 30. Alternatively, soldering tool 28 may be a laser soldering tool or a gas torch coupled to a source of combustible gas. Material source 24 includes a feed tip carrier 32, substantially similar to tool carrier 26, on which a feed unit 33 is mounted. Feed unit 33 is of generally known design and includes a feed tip 34 for directing solder wire 36 to solder points. Feed unit 33 is coupled to control circuit 100 (FIG. 6) and, in operation, receives solder wire 36 through a conduit 38 from a reel (not shown) and dispenses solder wire 36 at selectable rates and quantities depending upon the amount of solder material required at a given solder point in response to control signals from control circuit 100.

Heat source 22 and material source 24 are moveable within a range of positions for servicing and for executing soldering operations on workpieces 40. Soldering apparatus 10 may be installed for batch processing of workpieces 40, or as illustrated in FIG. 1, may be positioned adjacent to a conveyor 42, including a suitable support structure 44, for automatically advancing workpieces 40 into work positions within the range of movement of heat source 22 and material source 24. Where soldering operations are to be executed on workpieces 40 of different configurations, a code reader 46, such as an optical reader, is preferably provided adjacent to conveyor 42 and upstream of apparatus 10, to detect and register a characteristic of workpiece 40 representative of the workpiece configuration, such as a code 56 (see FIG. 2) applied to a face of workpiece 40. Where apparatus 10 is installed for batch processing, a similar code reader may be provided to permit automated soldering of different workpiece configurations without operator intervention. Preferably, code 56 is a bar code applied to the upper face of workpiece 40. Alternatively, code 56 could be applied to the lower face of workpiece 40, or could be another type of indicia such as magnetic code.

To further automate operation of apparatus 10 where hot-metal soldering tools are used, a tool wear monitor 48, such as a camera coupled to a vision control circuit 49 of generally known type (FIG. 6), such as a CCD, may be provided within the range of movement of heat source 22, adjacent to a reference position for soldering tool 28. Because hot-metal soldering tools gradually wear or erode due to heating and contact with solder points, operation of conventional point-to-point soldering devices using such tools must be interrupted periodically to check tool wear and to replace the tool if wear becomes excessive. Where apparatus 10 is equipped with tool wear monitor 48, tool 28 is periodically (such after a preset number of soldering operations) brought to the reference position in front of monitor 48, and monitor 48 captures an image of the tool tip and generates signals representative of the image. These signals are applied to vision control circuit 49 (FIG. 6) and the image is analyzed based on preselected criteria indicative of a wear threshold, such as by dividing the image into pixels to produce image-related data that is, in turn, applied to control circuit 100. From this image-related data, control circuit 100 analyzes the degree of tool wear, such as by determining the number of pixels representing the tool in the reference position and comparing this number to a known number of pixels representing an unworn tool. If tool 28 is found to be worn beyond a predetermined acceptable limit, positioner 14 and tool carrier 26 position and deposit worn tool 28 in a tool holder 50, and load a replacement tool 51 in carrier 26 from holder 50.

Figure 2:
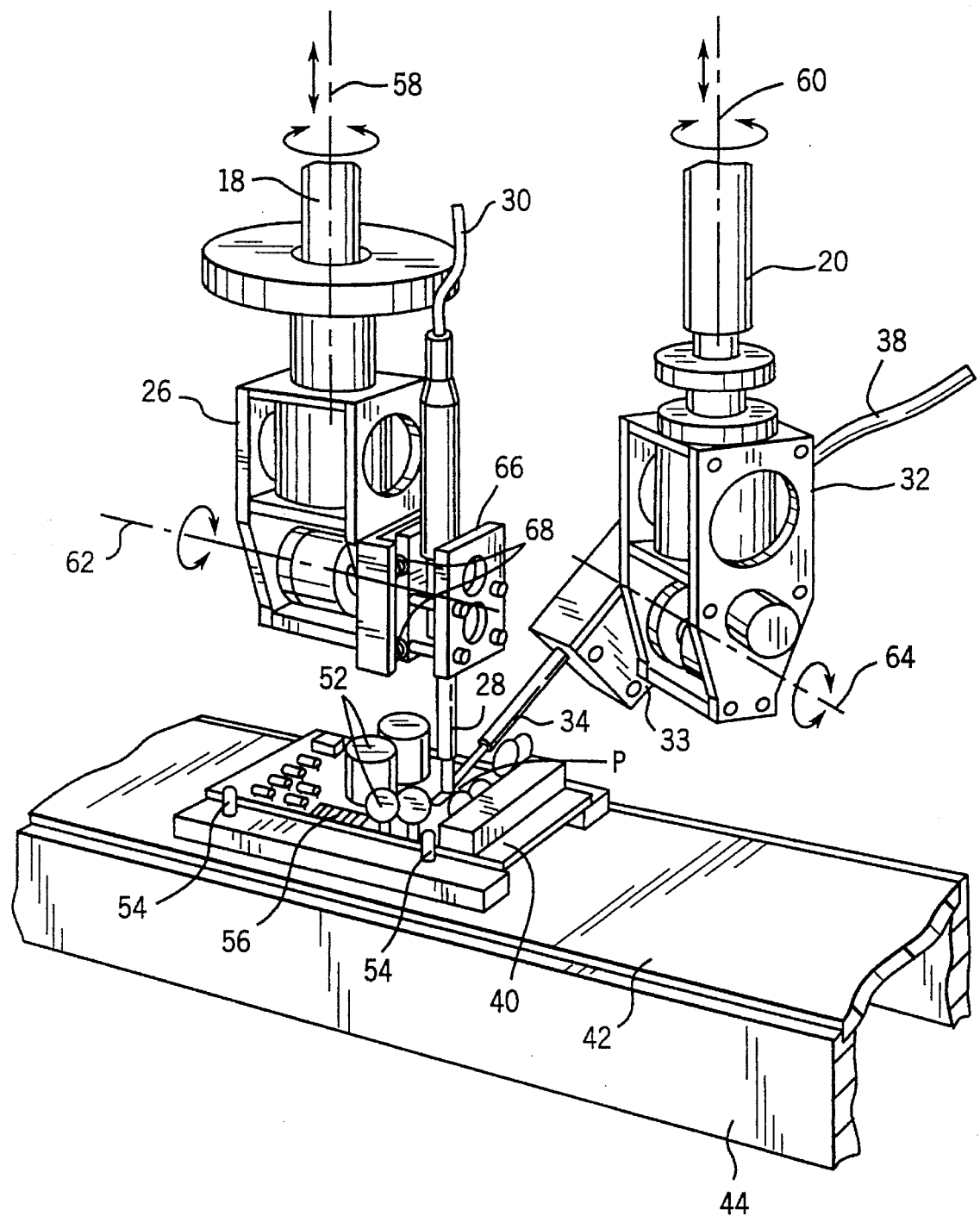
FIG. 2 is a perspective view of soldering tool and solder feed tip carriers of the apparatus illustrated in FIG. 1.
Figure 3:
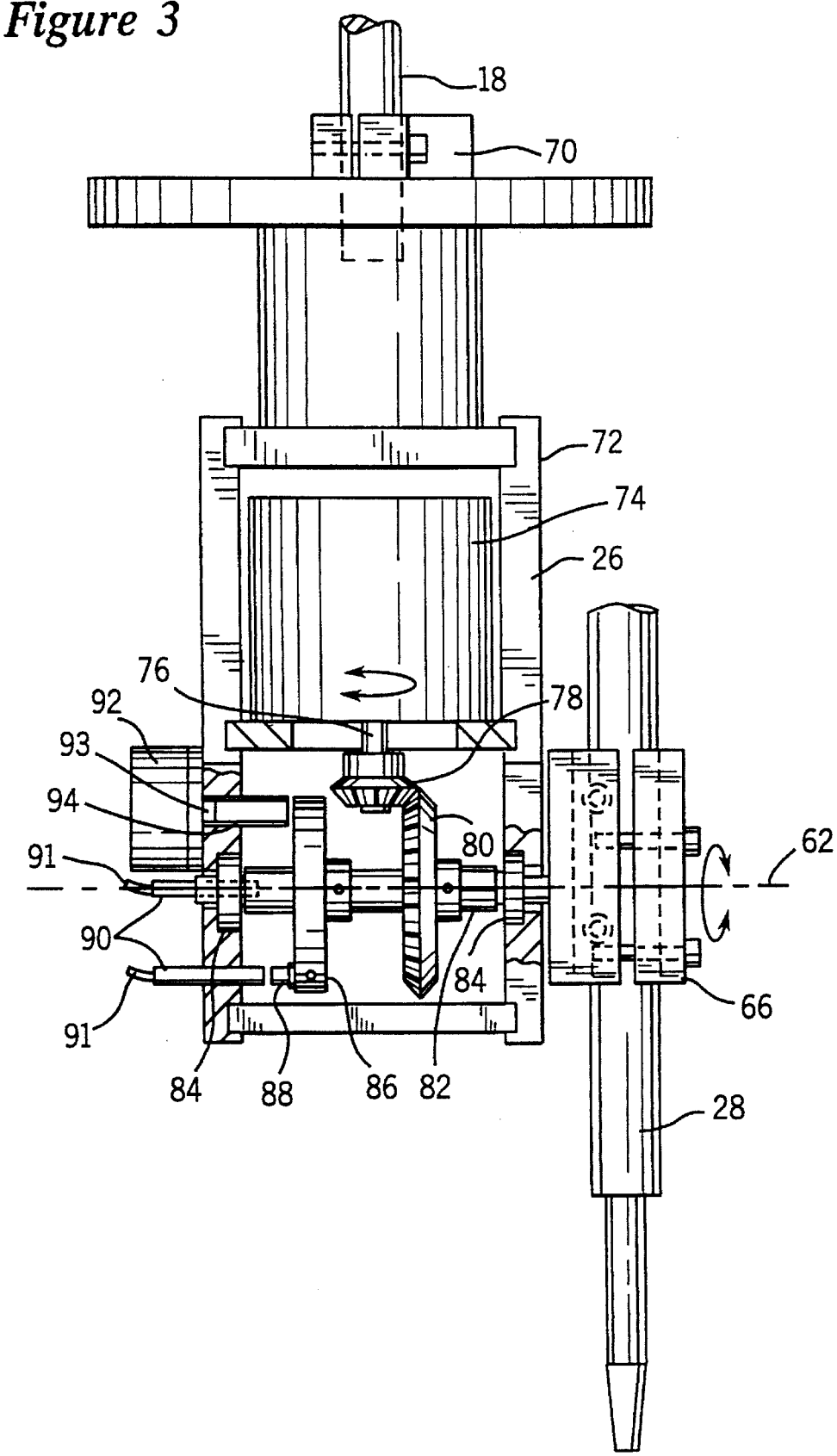
FIG. 3 is a partial sectional view of the soldering tool carrier shown in FIG. 2, illustrating a typical arrangement for angularly positioning the soldering tool.

The preferred structures for soldering tool carrier 26 and feed tip carrier 32 are illustrated in FIGS. 2 and 3. Solder points P between components 52 mounted on a workpiece 40 are precisely located with respect to a known reference location of workpiece 40, such as determined by locating pins 54. A single locating pin 54 or an array of such pins may be moveable between an engaged position in which pin 54 contacts and locates workpiece 40 in a reference location, and a non-engaged position in which workpiece 40 may be displaced along conveyor 42. As discussed above, a code 56, attached to workpiece 40, provides an indication of the soldering routine to be executed on workpiece 40, typically including the location of solder points P, the trajectories to be followed by soldering tool 28 and feed tip 34 to avoid contact with components 52 and with one another, the required temperature and duration of heating, and the amount of solder material to be applied to each solder point.

Tool carrier 26 is mounted on shaft 18 of robotic positioner 14 and may be rotated about axis 58 of shaft 18 and raised and lowered vertically along axis 58. Similarly, feed tip carrier 32 is mounted on shaft 20 for rotation about, and linear displacement along, axis 60 of shaft 20. Tool 28 is held in tool holder 66 and, because soldering tool 28 may contact workpiece 40 (e.g. where tool 28 is a hot-metal tool), tool holder 66 includes elastic shock absorbers 68 such as compression springs, to permit slight movement of tool 28 upon contact with workpiece 40. To further enhance the independent maneuverability of soldering tool 28 and feed tip 34, tool 28 and feed unit 33 are mounted on their respective carriers 26, 33 for independently controllable rotation about axes 62 and 64 respectively, as will be described in greater detail below.

Although only tool carrier 26 is shown in FIG. 3 and specifically described in the following discussion, in the preferred embodiment, tool carrier 26 and feed tip carrier 32 are of similar design and construction. As shown in FIG. 3, tool carrier 26 includes an upper bracket 70 for rigidly attaching carrier 26 to shaft 18. In addition, tool carrier 26 includes a frame 72 and a stepper motor 74 supported within frame 72. Stepper motor 74 has a downwardly facing shaft 76 on which a bevel gear 78 is mounted. Bevel gear 78 is positioned to mesh with a second bevel gear 80 mounted on a horizontal shaft 82 to transmit rotation from stepper motor 74 to shaft 82. Shaft 82 passes through frame 72 and is supported rotationally within frame 72 by bearings 84. Stepper motor 74 is coupled to control circuit 100 (FIG. 6), and in operation, when stepper motor 74 receives appropriate signals from control circuit 100, stepper motor 74 drives bevel gears 78 and 80, causing rotation of shaft 82 and hence of tool holder 66 and tool 28.

To facilitate locating tool 28 and controlling its angular orientation about axis 62, tool carrier 26 also includes a horizontal disc 86 mounted on shaft 82 as shown in FIG. 3. Disc 86 is shown to be rigidly attached to shaft 82 and thus rotates with rotation of tool holder 66. Disc 86 carries a reference position pin 88 extending toward a side of frame 72 opposite from tool holder 66. Pin 88 is displaced from axis 62 in the same direction as tool 28, such that the angular position of pin 88 with respect to axis 62 is indicative of the angular orientation of tool 28. Proximity sensors 90 penetrate through frame 72 at bottom and side locations (only two such sensors shown in FIG. 3) in alignment with pin 88 and corresponding to vertical and horizontal orientations of tool 28. Proximity sensors 90 are coupled to control circuit 100 through leads 91 and generate signals indicative the presence of pin 88 when tool 28 is either vertically or horizontally oriented. Thus, pin 88 and sensors 90 facilitate the precise positioning of tool 28 in known reference locations corresponding to the location of sensors 90, for initializing or calibrating stepper motor 74.

Tool 28 may be held in a desired angular orientation by actuation of a pneumatic holding cylinder 92 supported on frame 72. Cylinder 92 includes a rod 93 on which a brake pad 94 is mounted, extending toward disc 86. Cylinder 92 is coupled to a pneumatic circuit (not shown), responsive to control signals from control circuit 100. In operation, cylinder 92 may be actuated to extend rod 93 and urge brake pad 94 into contact with disc 86 to prevent rotation of shaft 82, and thereby maintain tool 28 in a desired angular orientation without exerting torque on stepping motor 74. Other structural arrangements to achieve these ends may be selected as appropriate by those skilled in the art, guided by the objectives set forth above, and all such adaptations are within the scope of the present invention.

Figure 4:
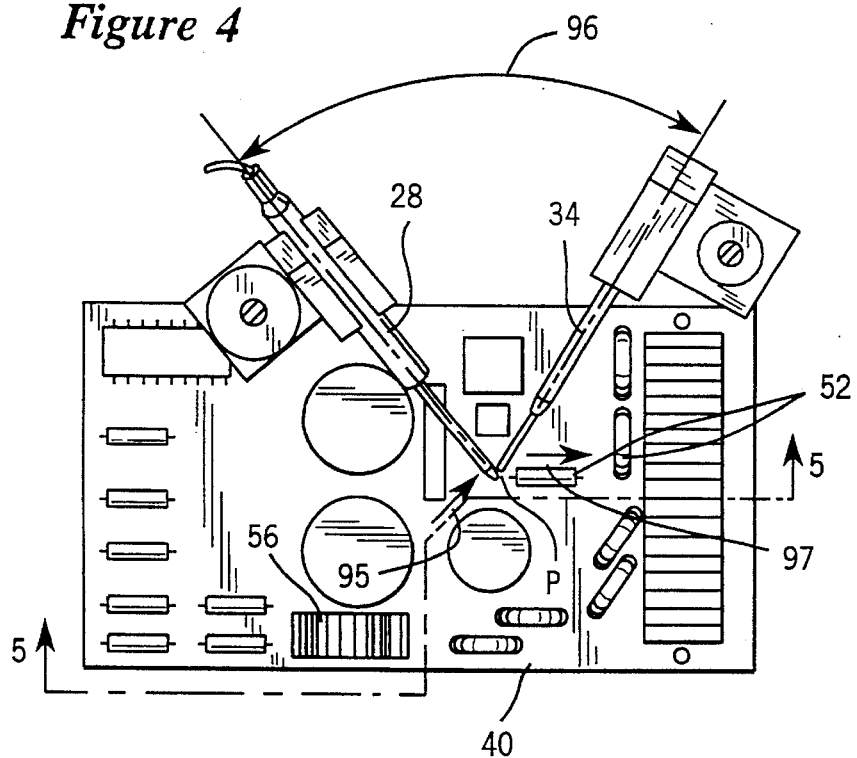
FIG. 4 is a top plan view of a workpiece illustrating the soldering tool and solder feed tip in position for applying solder to a solder point.
Figure 5:
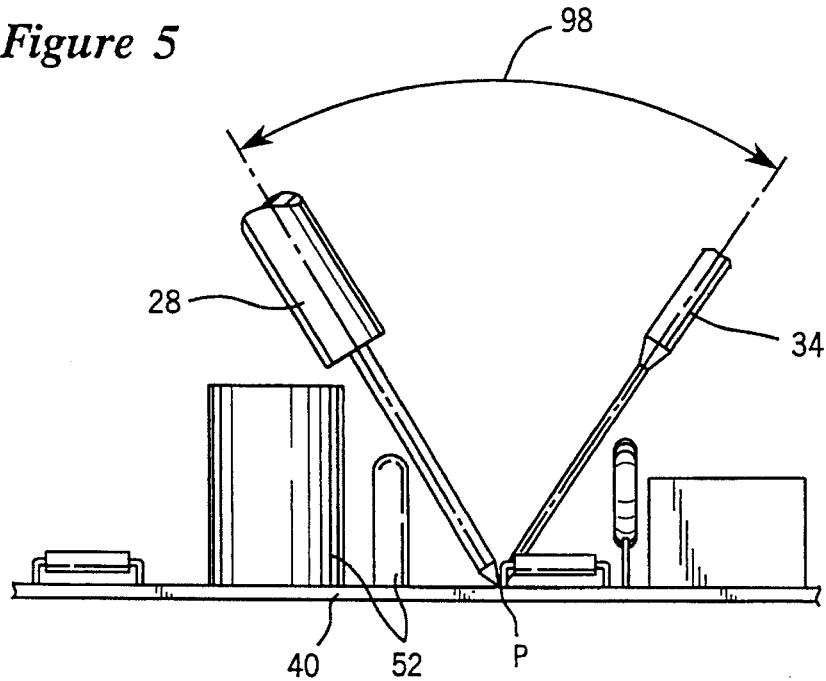
FIG. 5 is a partial sectional view of the workpiece of FIG. 4 taken substantially along the line 5—5, further illustrating the independent positioning of the soldering tool and solder feed tip.

FIGS. 4 and 5 illustrate the high degree of independence with which solder tool 28 and feed tip 34 may be positioned with respect to one another. The angles at which soldering tool 28 and feed tip 34 approach solder point P are independently determined by the position of robotic positioners 14 and 16, and the angle of rotation of tool holder 66 and feed unit 33 about axes 62 and 64 (FIG. 2). This aspect of the present soldering apparatus permits soldering tool 28 and feed tip 34 to penetrate between components 52 on a workpiece and to navigate between such components from one solder point to the next with a degree of flexibility heretofore unattainable with conventional point-to-point soldering devices. In particular, the angle between soldering tool 28 and feed tip 34 may be varied both in its horizontal projection 96 (FIG. 4) and its vertical projection 98 (FIG. 5). Moreover, once positioned adjacent to a solder point P, soldering tool 28 and feed tip 34 may be displaced completely independently during the soldering operation, as indicated by arrows 95 and 97, to optimize solder quality and to avoid cold soldering effects.

Figure 6:
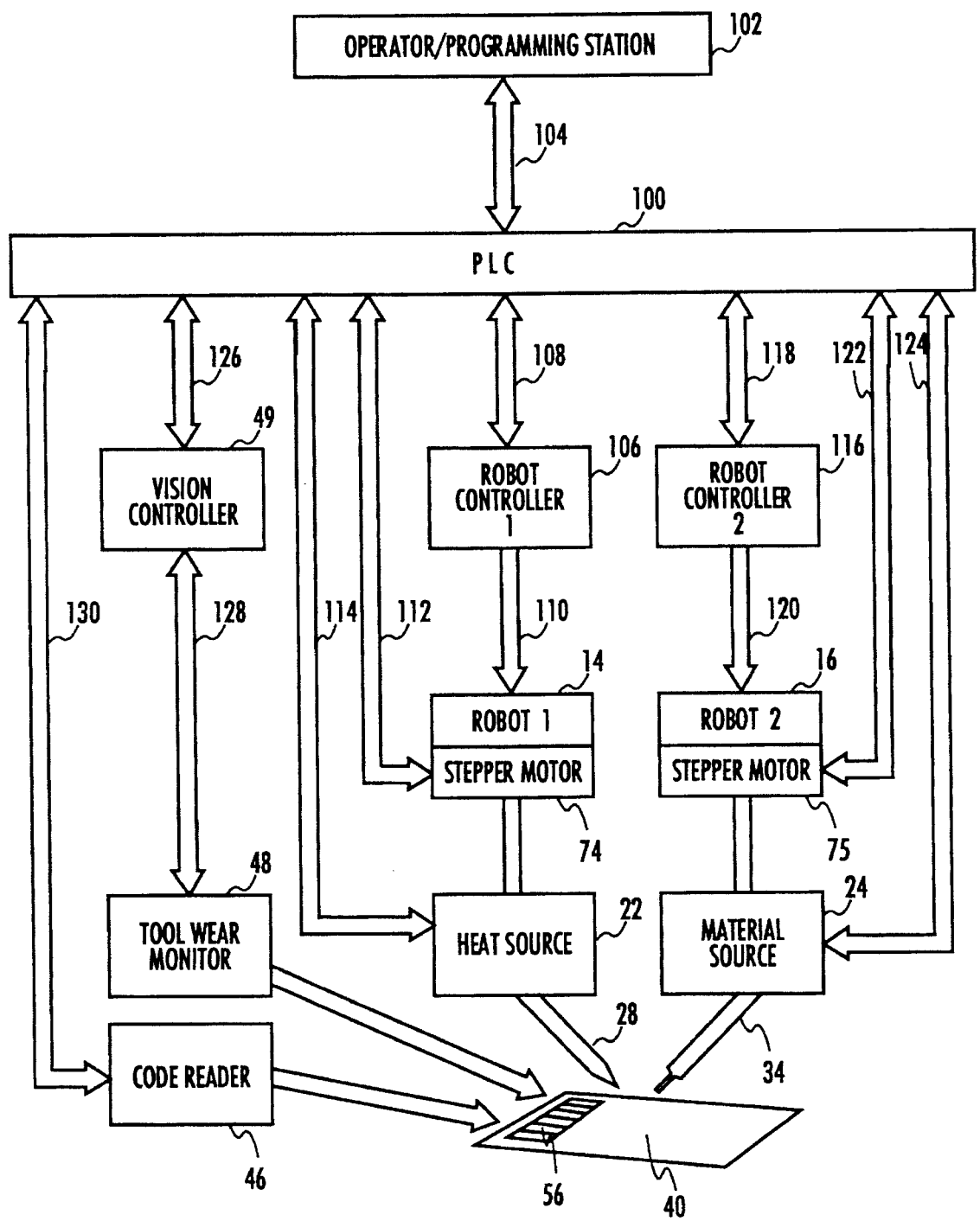
FIG. 6 is a block diagram illustrating the control architecture of the various elements in a typical soldering apparatus in accordance with the invention.

The control architecture of the preferred embodiment of apparatus 10 is diagrammatically illustrated in FIG. 6. A user-programmable control circuit 100, such as a programmable logic controller or PLC, functions as the master control circuit for apparatus 10. Control circuit 100 preferably includes appropriate memory circuits for storing soldering routines, filtering and isolation circuits for conditioning input and output signals, a digital-to-analog converter and a central processing unit for generating control signals based upon preset soldering routines and input signals received from the external system components. Control circuit 100 is coupled for data communication with an operator/programming station 102 via a data link 104. Operator/programming station 102 preferably includes an appropriate input device such as a keyboard or key pad for inputting soldering programs into control circuit 100, a monitor or display for viewing information relative to programs resident in control circuit 100, and switches for starting and interrupting soldering operations. Alternatively, an operator interface alone may be provided, with programs being entered into control circuit 100 via a separate programming module, such as a hand-held program input device.

A first robot controller 106 is coupled to control circuit 100 via a data link 108 and to first robotic positioner 14 via a second data link 110. Stepper motor 74 is carried by first robotic positioner 14 as described above, and is coupled to control circuit 110 via a data link 112. Stepper motor 74 is further coupled to heat source 22 to angularly orient soldering tool 28 as previously described. Heat source 22 is coupled to control circuit 100 via a data link 114. Similarly, control circuit 100 is coupled to a second robot controller 116 via a data link 118; robot controller 116, in turn, being coupled to second robotic positioner 16 via a data link 120. A second stepper motor 75, similar to stepper motor 74 but supported in feed tip carrier 32, is carried by second robotic positioner 16 and is coupled to control circuit 100 via a data link 122. Material source 24 is positioned angularly in response to rotation of stepper motor 75 to control the angular orientation of feed tip 34 and material source 24 is coupled to control circuit 110 via a data link 124.

In operation, control circuit 100 generates control signals for execution of a soldering routine on workpiece 40. Such routines typically include pre-programmed coordinates of solder points, coordinates of trajectory points through which soldering tool 28 and feed tip 34 should pass to avoid interference with components mounted on workpiece 40 and with one another, the temperature and dwell time required for soldering tool 28 to execute each soldering operation and the amount of solder material required at each solder point (generally determined as a function of the solder wire diameter and the feed rate, or "time on", of solder feed unit 33). In the present embodiment, control circuit 100 applies signals representative of the coordinates of end locations adjacent to solder points and of trajectory points to robot controllers 106 and 110. Robot controllers 106 and 110 separately determine the optimal paths and speeds between the respective points, generate and apply control signals to the various motors and linkages included in robotic positioners 14 and 16 (FIG. 1) accordingly to arrive at the solder points and apply signals to control circuit 100 indicating that positioners 14 and 16 have arrived at the desired locations. Control circuit 100 separately applies control signals to stepper motors 74 and 75 to bring soldering tool 28 and feed tip 34 into the desired angular orientation such that soldering tool 28 and feed tip 34 are positioned at locations adjacent to the pre-programmed solder points. Once in position, heat source 22 applies heat to the solder point and material source 24 advances solder wire in response to control signals from control circuit 100. The soldering routine implemented by control circuit 100 may further call for displacement of one or both of tip 34 and soldering tool 28 during a soldering operation, such as to obtain optimal flow of solder material and avoid inferior soldering due to cold soldering effects.

Where a tool wear monitor 48 is provided as discussed above, a vision controller 49 is coupled to control circuit 100 via a data link 126 and to monitor 48 via a second data link 128. At predetermined intervals in the execution of soldering routines, appropriate commands are directed to robotic positioner 14 and stepper motor 74 to bring tool 28 into close proximity with monitor 48 such that an image can be made of the tip of tool 28. Signals representative of this image are applied to vision controller 49 for analysis and data related to the image is transmitted to control circuit 100 where a decision is made as to whether replacement of tool 28 is required.

Where workpieces 40 of different configuration are to be soldered, code reader 46 may be positioned to detect and read a code 56 as discussed above. In this case, code reader 46 is preferably coupled to control circuit 100 via a data link 130. In operation, code reader 46 generates signals representative of code 56 and applies these encoded signals to control circuit 100. Based upon this input, control circuit 100 executes a corresponding resident soldering routine on workpiece 40.

Figure 7:
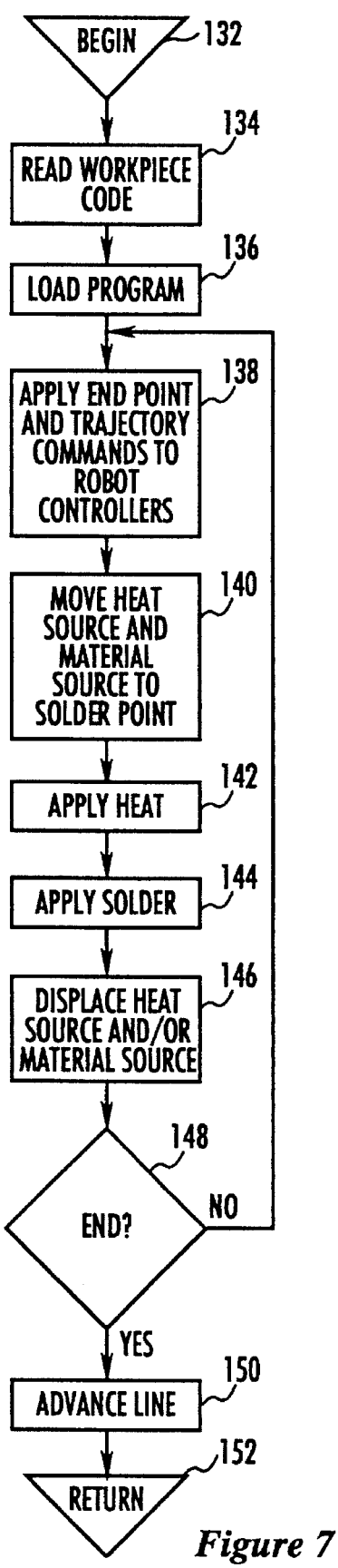
FIG. 7 is a diagrammatical flow chart of the steps in typical control logic implementing a soldering apparatus in accordance with the present invention.

In the arrangement described above, apparatus 10 is particularly adaptable for execution of various pre-programmed soldering routines on workpieces of different configuration, such as in an integrated manufacturing line, with very little operator intervention. The sequence of typical control logic implementing apparatus 10 in an automated process of this type is illustrated in FIG. 7. At step 132, a processing cycle of control circuit 100 begins and at step 134 code reader 46 detects code 56 indicative of the routine to be executed on the next workpiece 40 in line for soldering. Based upon this code, at step 136 control circuit 100 loads the appropriate program for execution. At step 138, control signals corresponding to the first solder point are applied to robot controllers 106 and 110 and to stepper motors 74 and 75. At step 140, robot controllers 106 and 110 command positioners 14 and 16 to move soldering tool 28 and feed tip 34 through pre-programmed trajectory points to their desired end positions and stepper motors 74 and 75 angularly orient tool 28 and feed tip 34 to locations adjacent to the first solder point. Once in position, robot controllers 106 and 110 signal to control circuit 100 that the positioning commands have been executed and at step 142 control circuit 100 signals soldering tool 28 to apply heat to the soldering point. At step 144, control circuit 100 commands feed unit 33 to begin feeding solder material to the solder point and to continue feeding for a predetermined time corresponding to the quantity of solder material to be applied. At step 146, where the routine being executed calls for displacement of soldering tool 28 or feed tip 34 during the soldering operation, control circuit 100 commands robot controllers 106 and 110, and stepper motors 74 and 75 to displace tool 28 or tip 34 accordingly. At step 148, control circuit 100 determines whether the end of the soldering routine has been encountered and, if it has not, returns to step 138 where commands related to the next solder point are generated. If at step 148 the end of the current soldering routine is detected, control circuit 110 goes to step 150, where the line (e.g. conveyor 42) is made to advance until the next workpiece is in position for soldering. At step 152, control circuit 100 is caused to return to step 132 to begin another operation cycle for the next workpiece.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

I claim:

1. A point-to-point soldering apparatus for applying solder to predetermined points on a workpiece, the apparatus comprising:

a heat source moveable between first locations adjacent to the predetermined points along first trajectories in response to control signals from a control circuit; and a solder material source moveable between second locations adjacent to the predetermined points along second trajectories independently of the heat source in response to control signals from the control circuit; and a control circuit coupled to the heat source and to the solder material source, the control circuit generating control signals directing movement of the heat source and the solder material source along the first and second trajectories to the first and second locations.

2. A soldering apparatus as recited in claim 1 wherein the heat source is moveable with respect to the solder material source during a soldering operation at the predetermined points.

3. A soldering apparatus as recited in claim 1 wherein the solder material source is moveable with respect to the heat source during a soldering operation at the predetermined points.

4. A soldering apparatus as recited in claim 1 wherein the heat source includes a hot-metal soldering tool.

5. A soldering apparatus as recited in claim 1 wherein the heat source includes a gas torch.

6. A soldering apparatus as recited in claim 1 wherein the heat source includes a laser beam emitter.

7. A point-to-point soldering apparatus for applying solder to predetermined points on a workpiece, the apparatus comprising:

a first robotic positioner;

a second robotic positioner;

a heat source coupled to the first robotic positioner, moveable through first trajectories to first locations adjacent to the predetermined points in response to control signals;

a solder material source coupled to the second robotic positioner, moveable through second trajectories to second locations adjacent to the predetermined points in response to control signals; and a control circuit coupled to the first and second robotic positioners and configured to generate control signals and to apply the control signals to the first and second robotic positioners to direct movement of the heat source and the solder material source to the first and second locations through the first and second trajectories.

8. A soldering apparatus as recited in claim 7 wherein the control circuit includes:

a master control circuit and a robot control circuit, the master control circuit being coupled to the heat source and to the solder material source and configured to generate control signals and to apply the control signals to the heat source and to the solder material source to cause solder to be applied to at the predetermined points, the master control circuit further being coupled to the robot control circuit and configured to generate control signals indicative of the coordinates of the first and second locations, the robot control circuit being coupled to the first and second robotic positioners and configured to generate control signals causing the robotic positioners to move the heat source and the solder material source to the first and second locations.

9. A soldering apparatus as recited in claim 8 wherein the master control circuit is included in a programmable logic controller.

10. A soldering apparatus as recited in claim 7 wherein the heat source includes a hot metal soldering tool removably mounted to the first robotic positioner, and wherein the apparatus further includes a tool wear monitoring device for detecting wear of the soldering tool, a tool replacement station for receiving worn and replacement soldering tools, and a tool wear monitoring circuit coupled to the monitoring device and to the control circuit and configured to generate signals indicative of tool wear and to apply these signals to the control circuit.

11. A soldering apparatus as recited in claim 10 wherein the tool wear monitoring device includes a camera coupled to the tool wear monitoring circuit.

12. A point-to-point soldering apparatus for applying solder to predetermined points on workpieces of varying configuration, the apparatus comprising:

a first robotic positioner;

a second robotic positioner;

a heat source coupled to the first robotic positioner and moveable through first trajectories to first locations adjacent to the predetermined points in response to control signals;

a solder material source coupled to the second robotic positioner and moveable through second trajectories to second locations adjacent to the predetermined points in response to control signals;

a workpiece recognition device for detecting a characteristic of a workpiece indicative of the workpiece configuration and generating an identification signal representative of the characteristic; and a control circuit coupled to the first and second robotic positioners and to the workpiece recognition device and configured to receive the identification signal, to reference a preset soldering routine based upon the identification signal, to generate control signals based upon the preset soldering routine and to apply the control signals to the first and second robotic positioners to direct movement of the heat source and the solder material source to the first and second locations through the first and second trajectories.

13. A soldering apparatus as recited in claim 12 wherein each of the workpieces carries optically coded indicia indicative of the workpiece configuration and the workpiece recognition device includes an optical code reader capable of detecting the indicia.

14. A soldering apparatus as recited in claim 12 further including a workpiece-locating member for engaging and locating the workpiece in a reference position.

15. A soldering apparatus as recited in claim 14 wherein the workpiece-locating member is moveable between an engaged position, wherein the locating member contacts and locates the workpiece in the reference position, and a non-engaged position, wherein the locating member is not in contact with the workpiece.

16. A method for applying solder to a solder point on a workpiece, the method being implemented by a soldering apparatus including a heat source, a solder material feed source and a control circuit coupled to the heat source and to the solder material feed source, the control circuit generating control signals and applying the control signals to the heat source and to the solder material feed source to control their operation, the method comprising the steps of:

(a) applying control signals to the heat source to direct movement of the heat source through a first trajectory to a first location adjacent to the solder point;

(b) applying control signals to the solder material feed source to direct movement of the solder material feed source through a second trajectory to a second location adjacent to the solder point independently of the heat source;

(c) applying heat from the heat source at the solder point; and (d) feeding solder material from the solder material feed source, whereby solder material is made to flow at the solder point.

17. The method of claim 16 including, during step (c), the further step of displacing the heat source with respect to the solder point.

18. The method of claim 16 including, during step (d), the further step of displacing the solder material feed source with respect to the solder point.

19. The method of claim 16 including, prior to step (a), the further steps of detecting a characteristic of the workpiece and of correlating the characteristic to reference data to determine the coordinates of the solder point.

20. The method of claim 19, wherein the characteristic is optical code and the reference data are stored in an electronic memory device.

* * * * *